March 31, 1959  G. J. NOWOTNY  2,880,259
PRIMARY BATTERY
Filed June 18, 1954  5 Sheets-Sheet 1
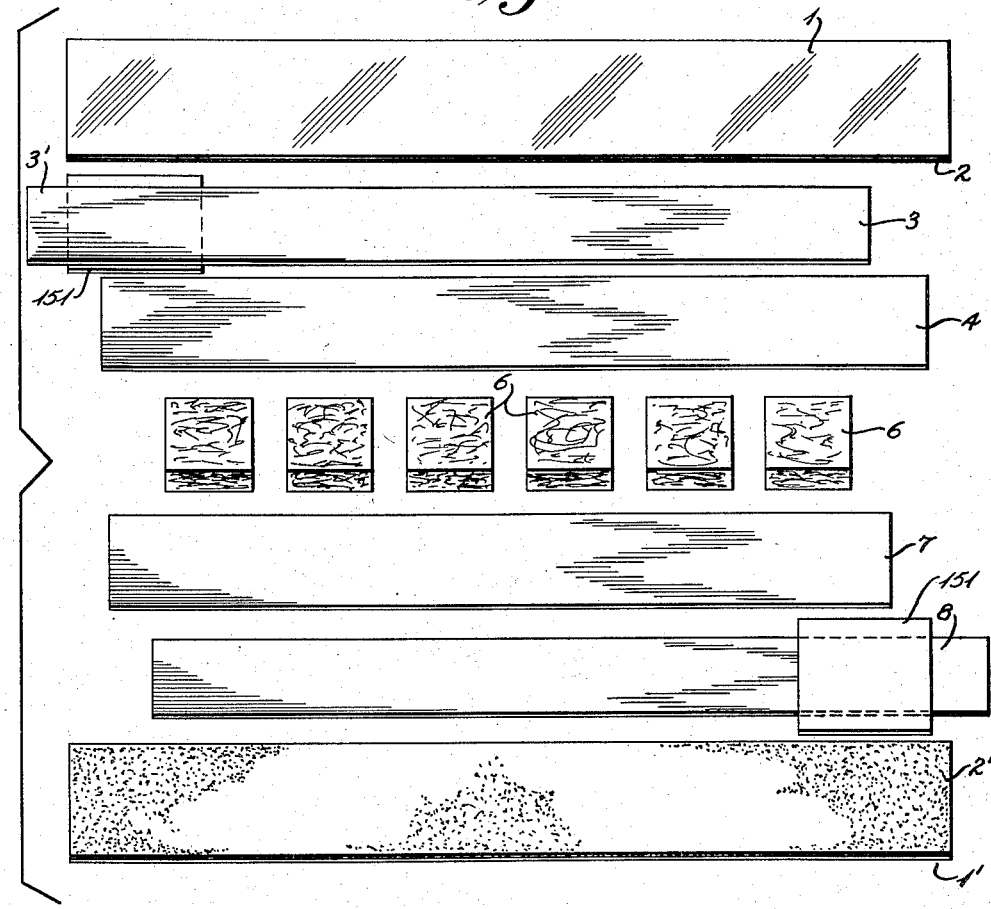
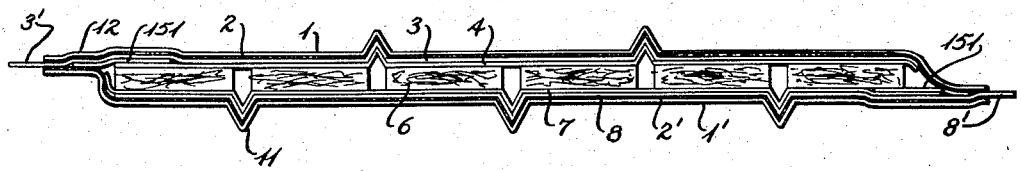
INVENTOR
Glenn J. Nowotny
BY Beale & Jones
ATTORNEYS

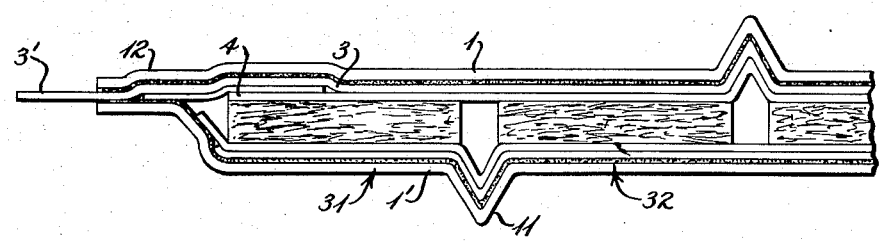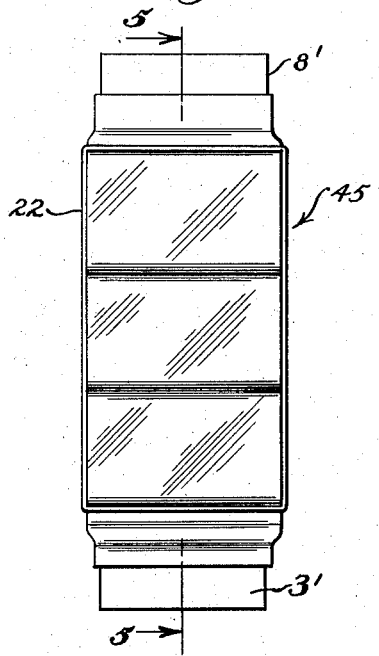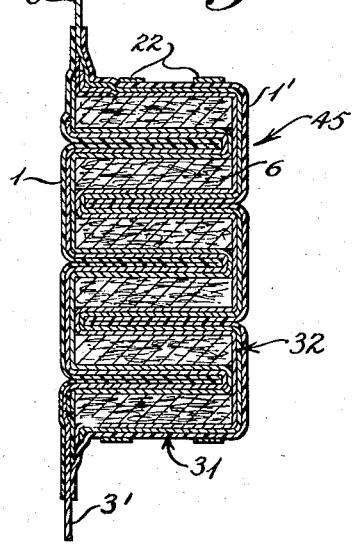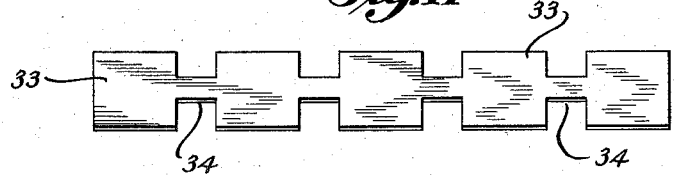

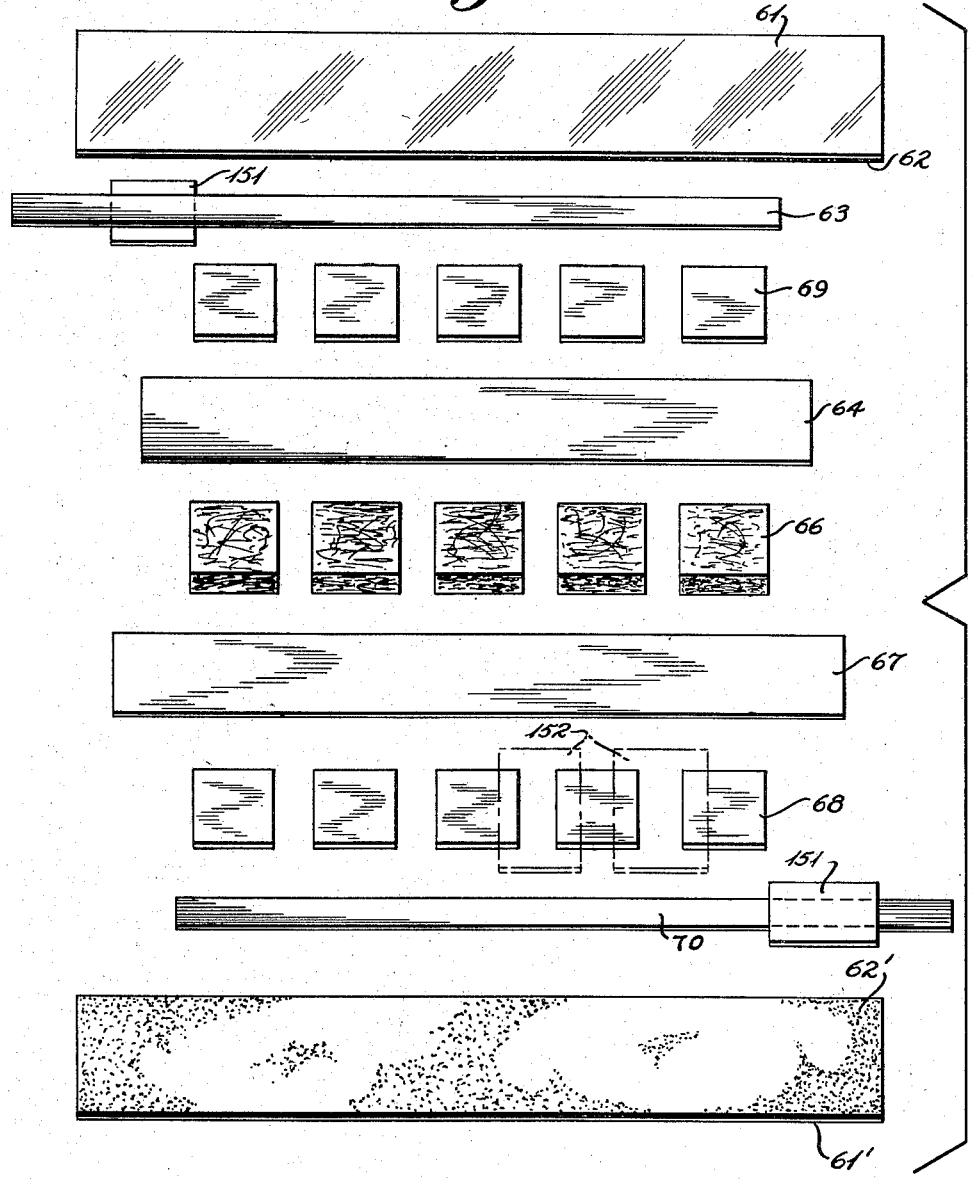

March 31, 1959  G. J. NOWOTNY  2,880,259
PRIMARY BATTERY
Filed June 18, 1954  5 Sheets-Sheet 4
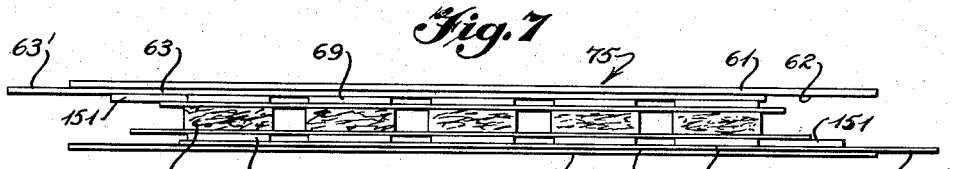
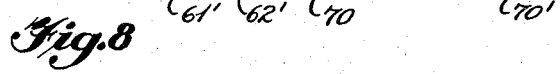
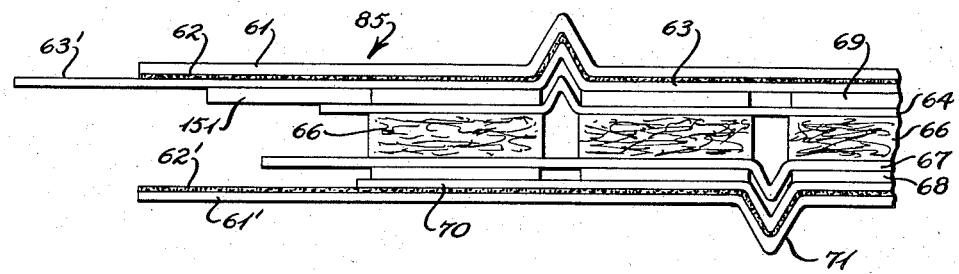
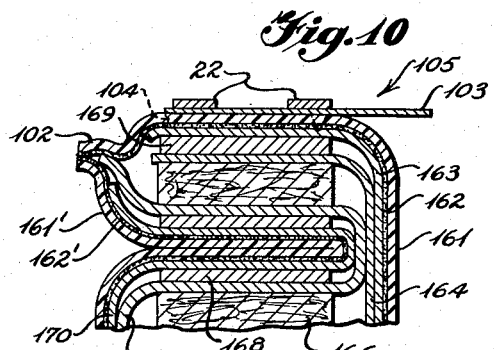
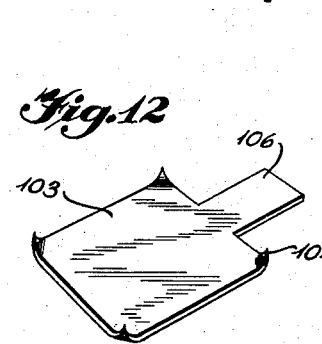
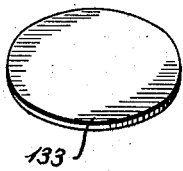
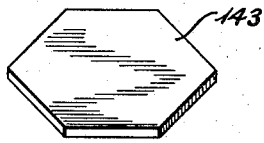
INVENTOR
*Glenn J. Nowotny*
BY  *Beale and Jones*
ATTORNEYS March 31, 1959  G. J. NOWOTNY  2,880,259
PRIMARY BATTERY
Filed June 18, 1954  5 Sheets-Sheet 5
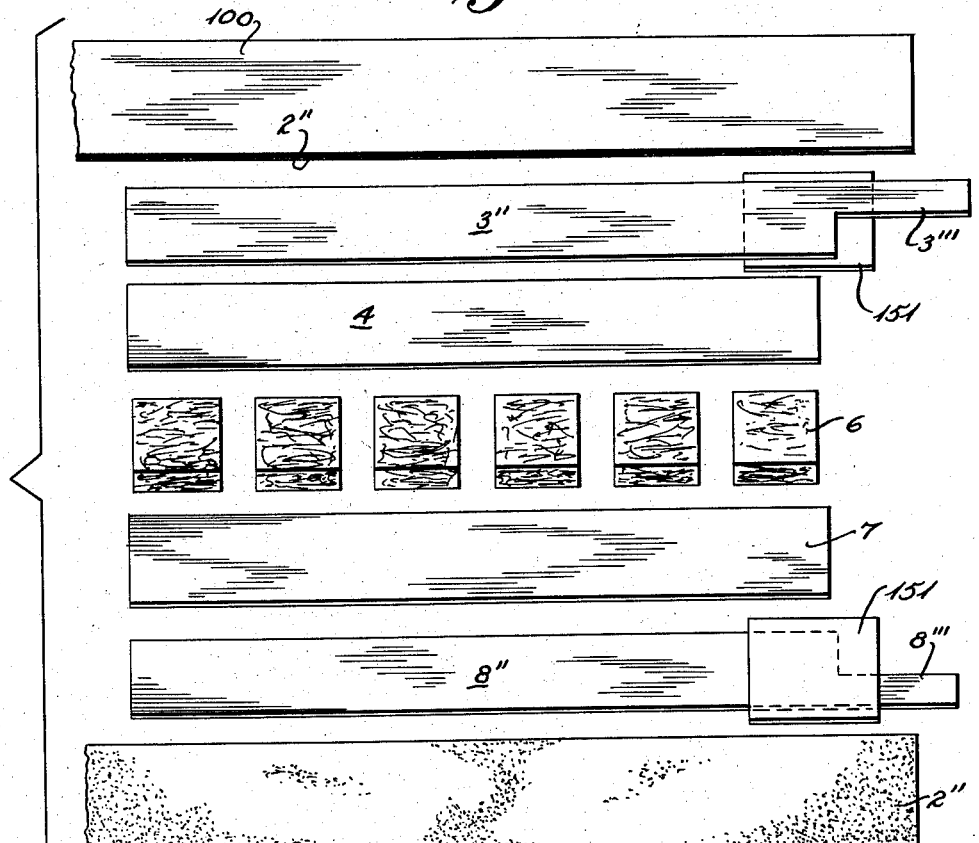
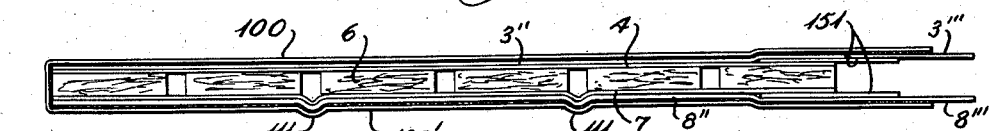
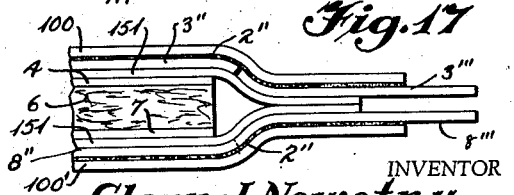
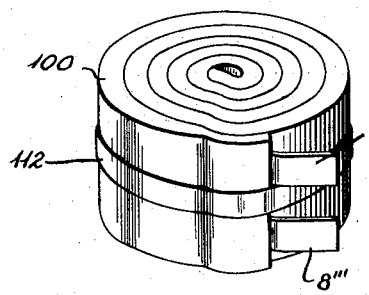
INVENTOR
Glenn J. Nowotny
BY Beale and Jones
ATTORNEYS

United States Patent Office 2,880,259
Patented Mar. 31, 1959

2,880,259
PRIMARY BATTERY

Glenn J. Nowotny, Madison, Wis., assignor, by mesne assignments, to The Electric Storage Battery Company, Philadelphia, Pa., a corporation of New Jersey Application June 18, 1954, Serial No. 437,644

11 Claims. (Cl. 136—111)

This invention relates to an improved primary battery employing flat cell elements and adapted to utilize to the maximum all usable space. More specifically this invention relates to a primary battery having internal conductive means for establishing electrical contact between the groups of cell elements comprising the battery.

In the past, it has been the conventional practice in forming the high current, low voltage batteries used for supplying the heater current for the filament of vacuum tubes to electrically connect in parallel the required number of cylindrical dry cells. In radio battery use, for example, the parallel-connected section of the battery, commonly referred to as the A section, might contain from two to eight size D cells. This form of battery construction has long been unsatisfactory in that the cylindrical cells are wasteful of space. Furthermore the paralleling of a group of conventional cylindrical dry cells is a tedious and difficult process and requires much expensive labor in handling the individual cells and in making the numerous solder connections. In addition, such batteries have been generally deficient in performance as space limitations have resulted in the A section being unsatisfactory and incapable of matching the performance of the B or series connection section in which flat cells are conventionally employed.

The present invention provides a structure in which flat cell elements are used in forming a parallel connected A battery. With this structure the A section can be tailored in shape so as to fit within irregularly shaped battery compartments. At the same time the use of flat cell elements affords the maximum capacity for a given volume and permits the construction of A and B battery sections with substantially equal or balanced capacities.

It is an object of this invention to produce a battery in which the individual cell elements are electrically connected in parallel by connectors which are housed within a plastic sheathing which also encloses all of the cell elements. A further object of the invention is to provide a battery in which the individual cell elements are electrically connected by means which eliminate the necessity for external connections between the cells of the battery.

These and other objects of the invention are achieved in a preferred embodiment of the invention by providing a structure comprising an outer envelope of dielectric plastic sheeting. Within the envelope are disposed a strip of metal which is the negative electrode of the cell, a strip of bibulous material over the negative electrode, electrolyte-wetted depolarizer material on the bibulous strip, and a conductive plastic sheet which functions as the positive electrode. The conductive plastic sheet is preferably sealed to the outer envelope layer along the edges of the conductive plastic sheet to form an interior pocket, within which is located a conductive strip which functions as a collector plate. The plastic sheath or envelope completely encloses these cell elements. Electrical contact with the cell may be achieved by extending the negative and positive conductive elements out of the envelope. Alternately, the elements may remain totally enclosed, and a connector plate may be used to pierce the sheath in such a way that there is no electrolyte leakage from the sheath. The invention may be best understood by reference to the drawings.

In the drawings, Figure 1 is an exploded view of one embodiment of the battery of the invention, with the parts shown in the relation they occupy to each other in preparing to assemble the battery.

Figure 2 is a side elevational, sectional view of the assembled battery shown in Figure 1. Figure 3 is a partial view of the section shown in Figure 2, in enlarged form, for clarity.

Figure 4 is an elevation of the battery, with the cells in folded relation to each other. Figure 5 is a sectional view taken along line 5—5 of Figure 4.

Figure 6 is an exploded view of a modified form of the invention.

Figure 7 shows the elements of Figure 6 in assembled relation in a side view, before sealing of the plastic sheath.

Figure 8 is a partial side view of the assembly of Figure 7, on an enlarged scale, showing the sheath pleated, ready for folding.

Figure 9 is a sectional side view of the battery formed by folding up the assembly of Figure 6.

Figure 10 is a partial view of a modified form of the battery of Figures 6 and 9, on an enlarged scale.

Figure 11, on the second sheet of drawings, shows in plan view, a modified form of the metallic electrode.

Figure 12 shows an end plate used in the modified form of the invention shown in Figure 10.

Figures 13 and 14 show modifications of the metallic plates used in the invention.

Figure 15 is an exploded view of a modified form of battery adapted for assembly into cylindrical form.

Figure 16 is a side view of the assembled elements shown in Figure 15, before the assembly is wound into cylindrical form.

Figure 17 is an enlarged sectional view of the end of the cell of Figure 16, after sealing the ends together.

Figure 18 is a perspective view of the cylindrical form of battery.

Referring now to the drawings, wherein like reference numerals refer to similar elements, the cell elements utilized in assembling an illustrative form of cell embodying the principles of this invention are shown in Figure 1. The external components of the envelope, which are of a non-conductive plastic, are represented as sheets 1 and 1'. The inner, facing surfaces of the sheets, 1 and 1' may be coated either partially or entirely with adhesive 2 and 2'. One electrode of the cell is a strip of sheet metal 8, sufficiently thin to be somewhat flexible. This strip 8 is adapted to be placed centrally upon the lower plastic sheet 1' and adhesively secured thereto. For a Leclanché type cell, the electrode 8 may be of zinc.

Overlying and in contact with the metallic electrode 8 is a sheet of bibulous electrolyte carrier 7, which may be starched paper, or any other suitable medium for absorbing and retaining the electrolyte solution. The bibulous material should be sufficiently wide to overlap the metal ribbon 8.

The mix cakes 6 are adapted to be placed in spaced relation over the bibulous layer 7. The mix cakes may preferably be preformed masses of some conventional depolarizer, such as the conventional mixture of manganese dioxide and some suitable form of carbon, as utilized in the Leclanché system. The mix cakes are wetted with a solution of the desired electrolyte. The plastic sheet 4 is of an electrolyte-impervious, electrically conductive plastic material, and forms the second electrode of the cell. Between the conductive sheet 4 and the upper plastic sheath 1 there is adapted to be placed a conductive backing strip 3, which functions as a collector plate. The conductive sheet 4 is preferably larger in all dimensions than the conductive strip 3, so that strip 3 may be enclosed in a pocket which is formed by the adhesion of the conductive sheet 4 to the outer plastic sheath 1. The collector plate 3 is thus protected from the electrolyte and all other active components of the cell by the conductive sheet 4 and yet is still enclosed within the cell envelope. Since the conductive plastic sheet 4 is impervious to the electrolyte solution, and since the sealed pocket formed by the conductive plastic sheet 4 and the outer plastic sheath 1 prevents any of the corrosive electrolyte solution from reaching the conductive backing plate 3, any suitable flexible conductor may be used. Sheet steel is an inexpensive, highly suitable material for this purpose. Copper and aluminum are also highly satisfactory.

When the intermediate elements have been positioned as described above, the edges of the plastic sheath sheets 1 and 1' are bonded together by compressing the adhesive around the entire margins of the two plastic sheets. The sealed end edges are shown in Figures 2, 3 and 4 of the drawings.

The battery just described may be regarded as a single cell, having continuous elements, or it may be regarded as a series of discrete cells connected in parallel. However considered, the cell or battery is most convenient for use in a compact form. Figures 4 and 5 show the battery in a convenient, box-like shape. In order to obtain this particular configuration, pleats 11 may be formed in the outer plastic sheath and the sheet elements attached thereto, with appropriate spacing of the mix cakes. These pleats are shown in Figure 2 and in greater detail in Figure 3. The pleats are formed alternately, first on one side of the sheath, and then on the other. When the battery is folded into the convenient shape of Figure 4, the material in the fold of each pleat should be sufficient to allow each stratum to assume its new position in the folded battery without undue stress or strain.

Electrical contact with the conductive plastic electrode 4 of the cell may be obtained by extending the extremity 3' of the collector plate 3 through the sealed end 12 of the outer plastic envelope. The adhesive-coated plastic sheaths 1 and 1' bond to the extremity 3' of the flexible backing plate 3 to form a seal which is fluid-tight and which prevents leakage of the electrolyte from the cell. This is best shown in the enlarged view in Figure 3, where it will be noted that the sheet of conductive plastic 4 and the lower strata, including the bibulous material and negative electrode, terminate short of the sealed end 12. Electrical contact with the metallic electrode may be obtained in a similar manner. The metallic ribbon 8 may be arranged so that one end protrudes through the sealed end of the sheath remote from the sealed end 12 at which the metallic collector plate 3 protrudes.

The convenient, squared configuration of assembly 45, shown in Figures 4 and 5, is obtained by folding the pleated assembly, shown in Figure 2, in accordion-fashion. Cells 31 and 32 of Figure 3 assume the positions indicated in Figure 5, at the lower end of the battery. The assembly may be maintained under moderate pressure by straps 22. The pressure exerted by the straps 22 maintains all of the cell elements in firm electrical contact and minimizes the possibility of a local high internal resistance caused by voids within the cell. It will be noted that in folding the battery the conductive sheet of the second cell 32 is folded over the conductive sheet of the first cell 31. Between the second cell 32 and its superadjacent cell, the zinc electrodes, or other metallic electrodes are folded over each other. The direction of the current flow thus is reversed in each succeeding cell, because of the manner of folding the battery.

At the point where the collector plate 3 is led out of the battery, both the metallic collector plate 3 and the conductive plastic sheet electrode 4 are exposed to the cell electrolyte. When this occurs, the metallic collector plate may be subject to electrolytic corrosion. In order to eliminate such corrosion, a small sheet of insulating, electrolyte-impervious plastic 151 may be inserted at this point. This small sheet of plastic is placed between the end of the conductive sheeting 4 and the overlapping and protruding portion 3' of the collector plate, and is of such size that the collector plate is effectively covered and shielded from the action of the electrolyte from this point to the point where it is sealed between the cell sheathing elements 1 and 1'. Thus, there is no point within the battery where the collector ribbon and the conductive plastic are each in contact with the electrolyte.

A similar piece of plastic material 151 may also be placed between the end of the bibulous layer 7 and the extending portion 8' of the metallic electrode sheet 8.

It should be understood that these small sheets of electrolyte-impervious plastic 151 may be omitted from the battery if desired and the conductive plastic 4 may be extended until it is embedded in the adhesive between the cell sheathing elements 1 and 1'.

A somewhat modified form of the invention is shown in Figures 6, 7, 8, and 9. In this modification of the invention, each cell of the battery has an individual metallic electrode 68 and an individual collector plate 69. Electrical connection between individual cells is obtained by the use of metallic ribbons 63 and 70, in contact with collector plates 69 and metallic electrodes 68, respectively, and extending throughout the entire length of the assembly. These ribbons are preferably disposed immediately adjacent the inner faces of the plastic sheath, and may extend beyond the sealed ends to provide terminals for the battery, in a manner similar to that described for Figure 2. This modification is shown on enlarged scale in Figure 8.

Referring now to Figure 6, the outer plastic sheaths 61 and 61' may be coated either partially or entirely on their interior surfaces with adhesive, 62 and 62' respectively. A conductive ribbon 70 is preferably but not necessarily centrally located on the lower plastic insulating sheet 61'. The electrode plates 68 may be disposed on the adhesive surface 62' of the outer sheath 61', over the connecting ribbon 70.

Bibulous material 67 overlies and is in contact with the electrode plates 68. The individual metallic electrode plates 68 and the ribbon 70 are preferably of the same material, which may be zinc for a Leclanché system. However, they may be of different metals providing they are compatible and do not upset the electrical stability of the cell. The mix cakes 66 are placed on the bibulous layer 67, positioned so as to overlie the electrode plates 68.

In assembling the remainder of the cell, it is preferable to begin by adhering the metallic ribbon 63 to the plastic sheath 61. The metallic collector plates 69 are then adhered to the plastic sheath 61. The plates 69 are centrally positioned on sheath 61 and are superposed over the ribbon 63 and in contact therewith. The sheet of conductive plastic 64 is similarly placed on the sheath 61 over the connecting ribbon 63 and the collector plates 69, and is adhered around its edges to the sheath 61. This forms a sealed pocket within the cell which prevents corrosion of the collector plates and the connecting metallic ribbon by the cell electrolyte. The outer sheaths 61 and 61' are then sealed together to complete the assembly.

Referring now to Figures 7 and 8, which show the cells as they are assembled, the extremity 63' of the metal connecting ribbon 63 protrudes from the assembly and provides the electrical contact with the contacting electrodes and the battery terminal, not shown. An extension 70' of the other connecting ribbon 70 projects from the opposite end of the cell and provides external electrical contact with the connecting electrodes, and the battery terminal, not shown. In positioning the electrode plates, and other elements, on the sheaths 61 and 61', sufficient space is provided between the individual cells so that the cell assembly may be readily folded into battery pack 95, as shown in Figure 9.

Experience with the battery illustrated in Figures 6, 7, 8, and 9 has shown that this construction is highly satisfactory and is characterized by long life, stability, and freedom from electrolyte leakage. In this construction zinc ribbons may be employed as the internal connecting ribbon 70, between the electrode plates or in place of the zinc ribbons, strips of solder-coated copper or solder-coated zinc or other suitable conductors may be substituted. A further addition may be made to the battery structure in the form of the electrolyte impervious, insulating plastic strips 152, which are placed between the zinc electrodes. These strips 152 are placed between the conductive ribbon and the zinc electrodes and extend a short distance beneath the edges of the zinc electrodes. In Figure 6, two such strips are shown in position, but it will be understood that when the strips are employed, they should be placed between all adjacent electrodes, for optimum results. With this construction, the insulating strips serve to protect the ribbon from excessive electrolytic corrosion. In place of individual insulating strips 152, a single continuous strip of insulating material provided with openings spaced to permit electrical contact between the connecting ribbon and the zinc electrodes may be employed. The other connecting ribbon 63, which provides internal connection between the individual collector plates 69, is shielded from the cell electrolyte since it is enclosed within the internal pocket in the cell formed by the conductive plastic cathode sheet 64 and the outer sheath 61 of the cell.

Each of the connector ribbons is liable to be exposed to the electrolyte at the point where it protrudes from the battery. Effective shielding at this point may be achieved by the use of small plastic strips 151, similar to those previously described in connection with the continuous strip battery shown in Figure 1. In the case of the connecting ribbon 63 adjacent the collector plates 69, the plastic strip 151 may be omitted and the conductive plastic strip 64 may be extended until the end thereof is embedded in the adhesive between outer strips 61 and 61'. In effect this extends the internal pocket to the seal at the end of the battery and shields connecting ribbon 63 from electrolyte throughout its entire length.

Figure 6 shows the other connecting ribbon 63 projecting from one end of the battery and connecting ribbon 70 extending from the other end of the battery. If desired both connecting ribbons may be brought out at the same end of the battery or both ribbons may be brought out at each end of the battery. With both ribbons taken out at the same end the projecting tabs 63' and 70' are preferably off-set from one another to avoid the possibility of shorting the terminals of the battery. As a further precaution a plastic strip 151 may be positioned so as to insulate one connecting ribbon 63 from the other connecting ribbon 70 at the point where the ribbons are brought out of the battery. If desired, the conductive plastic strip 64 may be extended until the ends thereof are embedded in the adhesive of the seal at the ends of the battery. In this case, a single plastic strip 151 is sufficient at the end of the battery to insulate the protruding connecting ribbon 70 from the end portions of conductive sheeting 64.

It is to be understood that the use of these strips 151 and 152 represents merely a possible improvement in the basic battery structure, and that their use does not change the fundamental structure or operation of the battery.

A further possible embodiment of the invention is illustrated in Figure 10. In this embodiment, the individual cell units comprise an electrode plate 169, mix cake 166, and a collector plate 168. The bibulous electrolyte-absorbent layer 164, the conductive plastic sheet 167, and the metallic connector ribbons 170 and 163 are continuous strips running throughout the entire length of the battery. The conductive plastic strip electrode 167 is sealed to the sheath 161' by an adhesive 162' The sealed ends of the sheaths join at 102 in a fluid-tight seal. The battery assembly 105 is held under moderate compression by suitable straps 22.

In this embodiment of the invention, the connector ribbons do not protrude from the cell, but are sealed within it. All of the cell elements are permanently sealed within the plastic sheath and the possibility of electrolyte leakage or evaporation is thus even further minimized. Electrical contact with the cell electrodes is made by means of a pair of contact plates 103, one of which is shown in full in Figure 12. This plate is provided with sharp, pointed projections 104 which may conveniently be located at the corners of the plate. When this plate is placed over an end of the battery pack, with the points facing into the pack and moderate pressure is applied, the points 104 penetrate the plastic sheath and make contact with the underlying metal plate. In Figure 10, the underlying plate is an electrode 169 of the cell, and the points 104 have pierced the plastic sheath 161 and the adhesive layer 162. The adhesive flows around the puncture and effectively seals the cell against electrolyte leakage and evaporation. A second plate (not shown) at the other extremity of the battery assembly makes contact with the collector plate 168 of the cell there located. This embodiment has the advantage that the battery may remain completely sealed until it is to be used.

In Figure 11 there is shown a modified form of possible inter-cell connection. This may represent either the metallic electrode and its connectors, or the collector plates for the plastic electrode and its connectors. The large, rectangular portions 33 correspond to the individual plates, whereas connector portions 34 correspond to the ribbons previously described. This embodiment has the advantage of providing integral, prefabricated units.

Although the electrodes, mix cakes, and the collector plates have been described throughout as square or rectangular plates, they may take other shapes equally well. For instance, the circular or hexagonal shapes shown in Figures 13 and 14 respectively may be utilized where a battery of this configuration is desired.

The battery described above has highly desirable characteristics in many respects. Its chief advantage is that the cell elements are completely enclosed except for one small connective tab at each end of the stack. Even these two tabs may be eliminated, if desired, in favor of a completely sealed stack, where the pointed contact plates are used.

Still another embodiment of the invention is illustrated in Figure 15. The cell elements shown here are particularly adapted for forming cylindrical cells. The cell elements include an adhesive-coated outer sheath 100, a metallic collector plate 3", a sheet of electrolyte-impervious conductive plastic 4, individual mix cakes 6, or alternatively, a continuous ribbon of depolarizer mix, a strip of bibulous material 7, a metallic electrode strip 8", and an adhesive-coated outer sheath 100'. The outer sheath 100 may be formed, in this embodiment, from one long, continuous strip of plastic which is doubled over on itself lengthwise to form the sealed envelope for the cell or battery, as illustrated in Figure 16.

Electrical connection with the exterior of the sealed cell envelope may be achieved by protruding the ends of the metallic ribbons, 3" and 8", through the sealed ends of the cell. However, because of the special problems involved in constructing a cylindrical cell, the ribbons 3" and 8" may be provided with a particular configuration. The collector plate 3" is provided with an extension 3'" which may be about one-third as wide as the collector plate and which is an extension of one side of the collector plate or may be laterally offset with respect to the center of the collector plates. The metallic electrode 8″ may be provided with a similar extension 8‴, which is arranged so as to be laterally spaced from the extension 3‴ of the collector plate. Thus, when the cell is formed into a cylindrical shape, as shown in Figure 18, the two cell terminals are suitably spaced from each other.

The small plastic strips 151 are desirably provided as internal covers for the protruding portions of the ribbons, in order to minimize the possibility of corrosion by the cell electrolyte. These strips are similar to those employed in previously disclosed embodiments of the invention.

In order to form the flat cell into cylindrical form, the flat cell is simply rolled up and secured with binding tape 112. Because of the peculiar problems presented by the cylindrical structure, the portion of the cell sheath 100 which is to be the outer side of the cylinder is preferably slightly longer than the inner portion. This additional length may be employed to best advantage in a series of pleats 111 in the portion of the sheath which is to be the outer wall of the cylinder. As the cylindrical form is assumed, the material in these pleats compensates for the difference between the circumferences traversed respectively by the inner and outer walls of the cells.

The sealed end of the cylindrical cell is illustrated in detail in Figure 17, including the plastic protective strips 151. These plastic protective strips, in this embodiment of the invention, not only protect the metallic strips from corrosion by the cell electrolyte, but also act as insulators in separating the projecting ends 3‴ and 8‴ of the metallic ribbons. It may be desirable, in this embodiment of the invention, to coat each side of each plastic protective strip 151 with adhesive, in order to increase the effectiveness of the seal. However, this is not essential, since the seal obtained by the adhesion of the two portions of the outer sheath 100 is often satisfactory. If desired, conductive plastic 4 may be extended until the end thereof is embedded in the adhesive forming the seal about projecting tabs 3‴ and 8‴. With this construction only a single protective strip 151 is necessary to insulate conductive plastic 4 from the projecting tab 8‴ of metallic ribbon 8″.

The invention has been described in general terms since it is applicable to many dry cell systems. It is particularly adapted for use in a Leclanché system, however, in which the metallic electrode is zinc, the bibulous material is starched paper, the mix cake comprises a manganese dioxide and carbon mixture wetted with an ammonium chloride-zinc chloride electrolyte, and the other electrode is a plastic impregnated with carbon particles to increase electrical conductivity. Desirably, the starched paper is impregnated with an ammonium chloride-zinc chloride solution. The metallic electrode has been described as a zinc ribbon or a group of zinc plates connected by a small zinc ribbon. It should be understood, however, that the negative electrode could also be a supporting material impregnated with zinc powder or other equivalent structure.

For a Leclanché cell the positive electrode of the battery is a sheet of conductive plastic, and may be selected from any of a well-known group of plastics. For instance, conductive sheets may be employed which are formed from vinyl polymers or other synthetic resins which are compatible with vinyl polymers and which are resistant to moderately concentrated acids and alkalies. Compositions containing finely divided carbon, and, as the film forming material, polyvinylbutyral resin or ethyl cellulose, are suitable. Other film forming materials which may be employed in these compositions include rubber, neoprene, chlorinated rubber, polyacrylates, polyvinylidene halides, polyacrylonitriles, copolymers of vinyl chloride and vinylidene chloride, polychloroprene, butadiene-styrene resins, and butadiene-acrylonitrile resins. The finely divided carbon may be in the form of graphite and either acetylene black or channel black or mixtures thereof. The carbon performs the dual function of imparting to the plastic its conductive characteristics and of acting as one electrode of the cell.

The outer non-conductive plastic sheath is preferably of Pliofilm for the Leclanché type cells. It is to be understood that by "Pliofilm" is meant a sheet of rubber hydrochloride. This particular type of non-conductive plastic has the advantage of being tough, resilient, tear-resistant and substantially impervious to both moisture and most gases, although it is capable of venting hydrogen by diffusion. It has the advantage of being resistant to the electrolyte used in the Leclanché cell. It is heat sealable by fusion and is readily bonded together by several well known adhesives. In lieu of Pliofilm, polyvinyl, polyvinylidinechloride and polyethylene films may be employed, as well as other types of non-conducting plastic sheet materials which have similar desirable characteristics.

With minor modifications, the structure described may be adapted for use with other cell systems. For instance, one electrode may be magnesium, aluminum, iron, or other metals or conductive sheets of plastic impregnated with such metals. The electrolyte may be alkaline for an alkaline cell system, if desired. Where an alkaline electrolyte is employed, the outer non-conductive plastic sheath should preferably not be Pliofilm, but should be a plastic material which is more resistant to an alkaline electrolyte, such as polyethylene. For such other systems, the conductive plastic sheet may still serve as the positive electrode, but for at least a part of the carbon, a finely divided metal may be substituted. The proper metal particles for the particular system desired should be used. Some metals which have proved particularly suitable are silver, gold, platinum, titanium, and stainless steel.

It will be understood from the foregoing descriptions of illustrative embodiments of the dry cells and batteries formed therefrom, and the component parts thereof, that considerable variation may be made within the scope of this invention. It should be understood that various changes may be made, as by substituting illustrative embodiments or elements disclosed in other figures of the drawings. Thus, for instance, the continuous series of plates and integral ribbon connectors shown in Figure 11 may be substituted for either the continuous ribbons of Figure 1 or for the separate plates and ribbons of Figure 6. Similarly, it should be understood that various minor modifications may occur to those skilled in the art, which will be within the scope of the invention. For example, instead of two mating sheets of non-conductive plastic for the external sheath of the battery, it is possible to employ a single sheet of plastic of double width, by folding it over once on itself. Likewise, it is not necessary to use adhesive to seal together the edges of the sheath; they may be heat sealed. In fact, in some instances, heat sealing is highly advantageous.

For certain uses it may be advantageous to employ only the conductive plastic sheet 4 of Figure 1 and eliminate entirely the current collector strip 3. When this construction is used it will be apparent that there is no need to form the internal sheath between the conductive plastic strip and the outer plastic strip 1 and therefore adhesive may be omitted entirely the positive side of the battery. Similarly if desired the adhesive coating may be omitted from the negative side of the battery and heat sealing used to seal the edges of the external sheath. In this modification the elements of the individual cells are restrained from shifting position by folding the sealed battery sheath in the zig-zag manner illustrated in Figures 5 and 9 of the drawings.

I claim:

1. A multicell primary A battery made up of a series of cells connected in parallel and enclosed within a single envelope, comprising a first electrode in the form of an elongated continuous strip of flexible material, a layer of bibulous material adapted to retain electrolyte solution superposed upon the first electrode strip, a plurality of depolarizer mix cakes arranged in longitudinally spaced relation on said bibulous material, a second electrode comprising an elongated continuous ribbon of electrically-conductive, electrolyte-impervious synthetic plastic material superposed upon the mix cakes, and an envelope of non-conductive plastic material enclosing the aforesaid components and sealing the electrolyte solution within the envelope, said sheet of electrically-conductive plastic material being continuously secured to an interior surface of the non-conductive plastic envelope to form an interior sealed pocket within the battery envelope, and within said pocket a flexible conductive element, adapted to function as a current collector, said battery being adapted to be folded accordion-wise into a compact, box-like shape.

2. The primary A battery of claim 1 in which the current collector is in the form of a rectangular metallic ribbon.

3. The primary A battery of claim 1 in which the current collector is in the form of a plurality of thin electrically conductive plates, corresponding in shape and in position with the mix cakes, said plates being electrically interconnected by a thin metallic ribbon.

4. The primary A battery of claim 1 in which the current collector comprises an integral electrically conductive strip in which large rectangles corresponding in size and in position in the battery with the mix cakes are physically and electrically connected by relatively narrow ribbon-like portions of the strip.

5. The primary A battery of claim 1 in which both an extremity of the first electrode and an extremity of the collector plate protrude from the sealed ends of said plastic envelope in mutually insulated relation to provide battery terminals.

6. A primary A battery according to claim 1 in which the cells are folded accordion-fashion to produce a compact battery, each succeeding cell in the series being positioned above its neighbor, all of said cells being held in said superposed position under slight compression by securing means external to the plastic envelope.

7. A primary A battery comprising a series of cells connected in parallel and enclosed within a single envelope, electrolyte solution within said envelope comprising a first electrode in the form of an elongated continuous strip of anodic material, a layer of bibulous material adapted to contain electrolyte solution superposed upon the first electrode strip, a plurality of depolarizer masses superposed upon said layer of said bibulous material, said masses being spaced apart one from the other and being arranged longitudinally on said layer, a second electrode comprising a continuous elongated ribbon of electrically-conductive material superposed upon the said depolarizer masses, and a non-conductive envelope enclosing the aforesaid assembled components and sealing electrolyte within said envelope, said battery being adapted to be folded accordion-wise into a compact, box-like shape.

8. The primary A battery of claim 7 wherein the non-conductive envelope contains a lateral pleat whereby the accordion-wise folding is facilitated.

9. A dry primary A battery comprising a group of cells electrically connected in parallel, each cell comprising in sequential arrangement, metallic electrode means, a layer of bibulous material, a depolarizer mix cake, a continuous second electrode of electrically conductive plastic sheeting in contact with the mix cakes of said cells, a continuous conductive strip in contact with said continuous second electrode of said cells, and an electrolyte-impervious sheath of flexible plastic sheeting, said continuous second electrode of electrically conductive plastic sheeting and said electrolyte-impervious sheath of flexible plastic sheeting being larger in width and length than said continuous conductive strip and said continuous second electrode of electrically conductive plastic sheeting and said electrolyte-impervious sheath having their margins beyond the edges of said continuous conductive strip sealed together to form a continuous conductive-strip-enclosing pocket in said battery.

10. A dry primary A battery as described in claim 9 wherein said battery is arranged in a compact box-like shape with said metallic electrode means and said mix cake of said cells positioned one above the other.

11. A dry primary A battery as described in claim 9 wherein an electrically conductive lead is connected to said continuous conductive strip and extends through said pocket to the exterior thereof.

References Cited in the file of this patent

UNITED STATES PATENTS

| | | |
|---|---|---|
| 1,706,005 | Thompson | Mar. 19, 1928 |
| 2,519,053 | Reinhardt | Aug. 15, 1950 |
| 2,519,527 | Wilkinson | Aug. 22, 1950 |
| 2,534,881 | Schroeder | Dec. 19, 1950 |
| 2,547,262 | Greenstein | Apr. 3, 1951 |
| 2,631,180 | Robinson | Mar. 10, 1953 |
| 2,635,128 | Arbogast | Apr. 14, 1953 |
| 2,637,756 | Coleman et al. | May 5, 1953 |
| 2,658,098 | Coleman et al. | Nov. 3, 1953 |
| 2,666,803 | Kurlandsky | Jan. 19, 1954 |
| 2,713,602 | Shuman | July 19, 1955 |
| 2,745,894 | Nowotny | May 15, 1956 |